June 3, 1969 R. S. CASS 3,447,729
SINGLE BELT DRIVE
Filed Nov. 7, 1966 Sheet 1 of 2

INVENTOR.
RALPH SIDNEY CASS

BY Christie, Parker & Hale
ATTORNEYS

INVENTOR.
RALPH SIDNEY CASS
BY
Christie, Parker & Hale
ATTORNEYS

United States Patent Office 3,447,729

Patented June 3, 1969

3,447,729

SINGLE BELT DRIVE

Ralph Sidney Cass, Azusa, Calif., assignor to Leach Corporation, San Marino, Calif., a corporation of Delaware Filed Nov. 7, 1966, Ser. No. 592,658
Int. Cl. F16g 1/00
U.S. Cl. 226—49 7 Claims

ABSTRACT OF THE DISCLOSURE

A belt drive system is disclosed employing a single continuous elastic belt engaging two driven pulleys rotatabe mounted on a base for driven rotation in the same direction about their mountings, and also engaging a drive pulley having at least two radially disposed belt engaging surfaces joined together and rotatably mounted on the base for driven rotation together about its mounting in one of two rotational directions, The diameter of the driven pulleys are equal, while the drive pulley diameters are unequal in order to provide a speed differential between the driven pulleys in response to either direction rotation.

This invention relates to a belt drive which is particularly well suited for use in tape recorders.

All tape recorders employ some system to drive magnetic tape across a magnetic recording and playback head. Tape is contained in tape packs or reels which dispense and store tape as it passes across the head. Most tape recorders require tape travel in two directions across the head. A tape pack which serves as a dispensing or supply reel when the tape passes across the head in one direction will become a storage or take-up reel when the tape direction is reversed.

For optimum performance, tape crossing the magnetic head must pass at constant velocity and under constant tension. Constant velocity is required to avoid playback or recording distortion known as flutter. Constant tape eliminates certain flutter components, insures proper tracking and guidance of the tape, maintains a correct bias level and avoids other well known problems such as vibration and acceleration disturbances. Constant velocity has been provided through the use of capstans to drive the tape at the desired rate across the head. Accurate systems have been devised to maintain constant tape tension across the head which include reel servos and complicated differential capstan drives. In order to avoid reel influence on the tape crossing the head, reel torques have been made small relative to the tension imparted by the torque of the capstans. While effective, these systems are expensive and complicated.

One system devised to accommodate the many requirements of proper recorder performance employs two capstans which drive a continuous elastic belt. The belt passes over the dispensing and storage reels in contact with the peripheral surface of tape wound on the reels. One capstan is driven at a slightly faster speed than the other to develop tension in the section of the belt which passes from the slow to the fast capstan. The belt will elongate in the section under tension with respect to the unstressed section which passes from the fast to the slow capstan. To maintain a condition of equilibrium, the elongated section will have a linear speed slightly in excess of the speed in the remaining section of the belt. The excess of linear speed is used to drive the storage reel at a faster rate than the dispensing reel which results in the tensioning of tape passing across and from the magnetic head. When it is desired to reverse the direction of tape travel, the direction of capstan rotation is reversed resulting in a slightly higher linear speed in the section of the belt formerly traveling at the slower rate and the tensioning of tape across the magnetic head.

The capstan driven tape drive just described, while marked by its simplicity, suffers many disadvantages. Accurate tape tracking across a magnetic head is required in any tape recorder for quality recording and playback. If a tape reel is not uniformly wound, that is, if lateral displacement between individual sections of wound tape exists, accurate tracking is not possible. A belt which contacts tape in the reels must, therefore, exert only a normal force against the tape to avoid a lateral displacing force. Unfortunately, surface irregularities in existing belts and alignment problems in the belt drive assembly produce irregular lateral displacement of the tape and poor tracking. This displacement may be of such magnitude as to prohibit tape direction reversal. In addition, the belt bearing against the tape has a tendency to elliptically shape wound tape which produces speed variations in the tape across the recorder's head, particularly when an otherwise desirable high normal loading is employed. In tape systems which operate at relatively high speeds, an air barrier is likely to be created between the tape and the drive belt resulting in slippage and improper winding and dispensing. Another disadvantage in the capstan driven tape drive described is the practical inability to have a high wrap angle around the capstans. Slippage between the capstans and the belt must be minimized in order to avoid erratic speed variations in the tape crossing the head. The greater the contact, therefore, between the belt and the capstans, the lower the amount of slippage which will be encountered. Moreover, the peripheral speed of tape on the dispensing and storage reel will be determined by the speed of the belt which drives the reels. The diameter of tape being dispensed by one reel and accumulated by the other does not vary linearly with respect to each other. This non-linearity produces changes in the tension of the drive belt which must be compensated for by a constant tensioning device such as a spring-loaded idler which produces resonant problems in certain environments.

The subject invention overcomes the above and associated problems by providing an efficient, simple and reliable belt drive.

Briefly, the invention contemplates a belt drive system using a single continuous elastic belt, two driven pulleys and a drive pulley. The driven pulleys have radially disposed belt engaging surfaces of equal diameters. The diameters of the driven pulleys are made equal to provide a constant speed differential between the pulleys in either direction of pulley rotation. The drive pulley has two radially disposed belt engaging surfaces having a diameter differential selected to effect a desired rotational velocity differential between the two driven pulleys. The continuous elastic belt is engaged in tension by the belt engaging surfaces of the driven pulleys and drive pulley such that the velocity differential between the two driven pulleys is reversed when the direction of rotation of the drive pulley is reversed. If the diameters of the driven pulleys are not the same, the desired absolute velocity differential imparted by the different diameter belt engaging surfaces of the drive pulley will not occur upon reversal of pulley rotation because the driving sections of the elastic belt are reversed.

In order to maintain alignment between the belt engaging surfaces of the pulleys and the elastic belt, use is preferably made of canted idlers. These idlers are positioned to contact the elastic belt in tension and to pass the belt over the belt engaging surfaces of the pulleys substantially perpendicular to the rotational axis of each of the pulleys, i.e., the belt enters the belt-engaging surfaces on a tangential axis which is coaxial with the belt-engaging surfaces rather than being at a skewed angle relative thereto. The idlers are employed because the belt engaging surfaces of the drive pulley are at different elevations and the relative elevational position of the driven pulleys may be such as to require the belt to occupy different vertical positions.

The belt drive of this invention is ideally suited for use in tape recorders which employ capstans to drive magnetic tape across the recorder's magnetic pickup and recording head. In this embodiment, the drive pulley is driven by a constant speed electric motor which is capable of reversing its direction of rotation. Each of the driven pulleys is connected to one of the recorder's capstans. Both driven pulleys will rotate in the same direction. However, the pulley driven by the belt which engages the larger diameter belt engaging surface of the drive pulley will rotate sightly faster than the other driven pulley. The fast pulley will drive its associated capstan at a slightly faster rate than the capstan driven by the slow pulley producing the desired tension in magnetic tape crossing the magnetic head. When the rotation of the electric motor is reversed, the capstan which was formerly rotating at the slower speed will become the fast capstan to maintain the desired tape tension. This reversal in relative capstan speeds is produced because the larger diameter engaging surface of the drive pulley becomes the driving surface for the driven pulley which was formerly the slow pulley.

The belt drive of the instant invention is marked by its simplicity and accuracy. The problems associated with the belt drive system requiring the passage of an elastic belt in contact with tape on storage and dispensing reels of a tape recorder are overcome because there is no requirement for belt-tape contact. Without belt-tape contact there is no lateral displacement of tape wound or dispensed in the reels because there is no force component from the belt acting on the surface of the tape. Moreover, the elimination of belt-tape contact avoids elliptical packing of tape on its reels and, thus, concomitant speed fluctuations. The drive afforded by the subject invention avoids the possibility of an air barrier developing between the belt and the tape because the recorder's capstans and not an elastic belt directly drive the tape. Moreover, high-warp angles are possible when using the instant belt drive because the drive geometry is not dictated by belt-tape contact. With high-wrap angles slippage is minimized or eliminated. In addition, the non-linearity problem previously described is not present.

These and other features, aspects and advantages of the instant invention will become more apparent from the following description, appended claims and drawings, in which:

Figure 1:
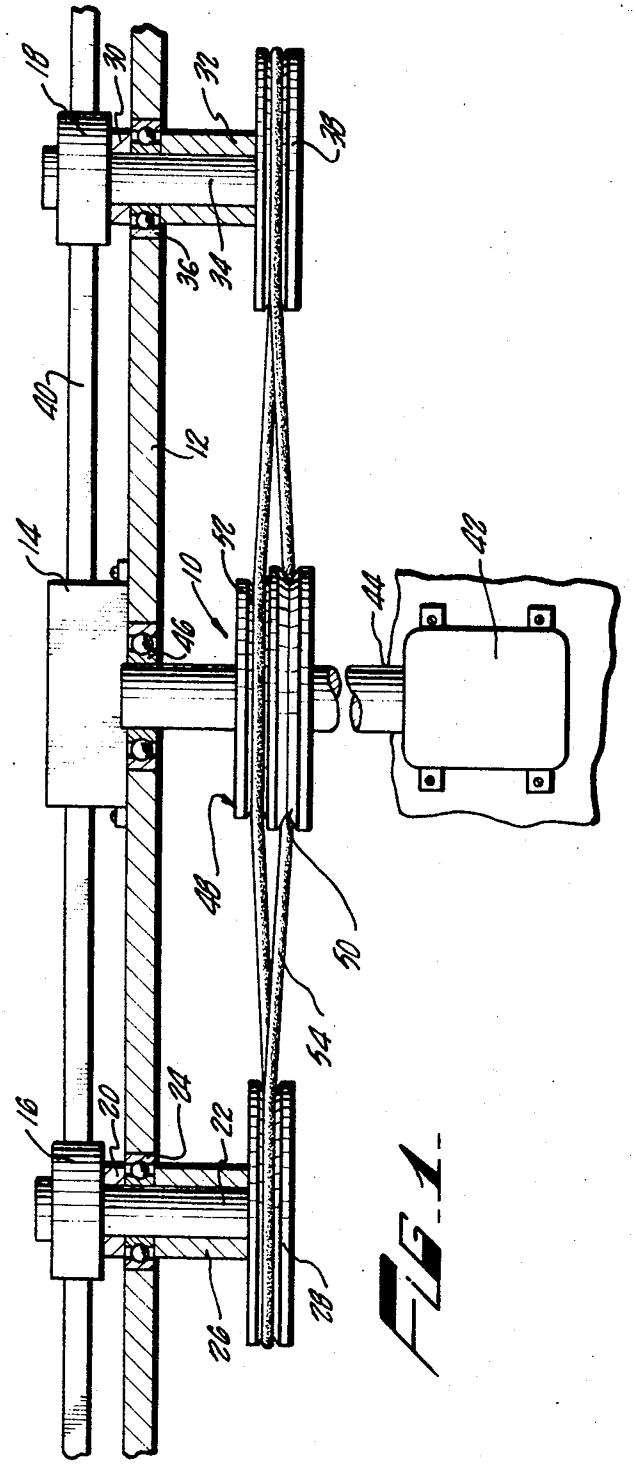
FIGURE 1 is an elevational schematic view, partly in section, of the belt drive of the instant invention used with a tape recorder.
Figure 2:
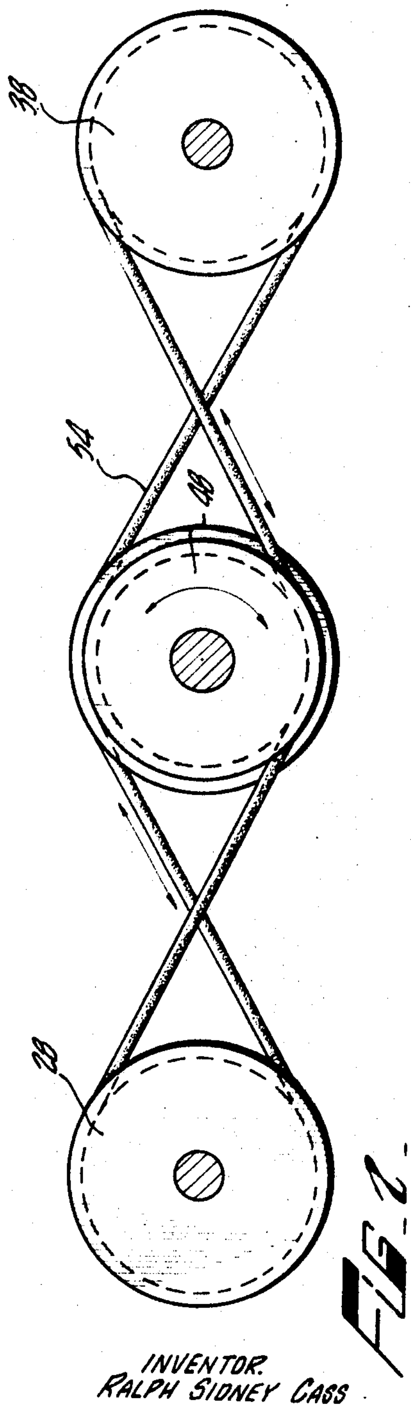
FIGURE 2 is a top plan view of the drive illustrated in FIGURE 1.

FIGURES 1 and 2 illustrate one embodiment of the belt drive 10 as used in a tape recorder. The tape recorder has a deck or plate 12 upon which is mounted a magnetic recording and pickup head 14 of standard design. A pair of capstans 16 and 18 are rotatably mounted on the deck as in previous tape recorders. For this purpose, sleeve 20 is disposed between capstan 16 and deck 12 to properly position capstan 16 with respect to head 14. Shaft 22 is secured to capstan 16 to drive the latter in rotation. Bearing 24 is mounted in deck 12 to receive shaft 22. Driven pulley 28 is secured to shaft 22 which is positioned below deck 12 in sleeve 26. The mounting of capstan 18 is identical with the mounting of capstan 16. Thus, sleeves 30 and 32 receive shaft 34 which drives capstan 18. Bearing 36 receives shaft 34 and provides lateral position integrity for the shaft and capstan. Driven pulley 38 is secured to shaft 34. The effective belt engaging diameters of pulleys 28 and 38 are the same. Magnectic tape 40 is driven by capstans 16 and 18 across head 14.

Drive 10 includes an electric motor 42 which drives shaft 44 in rotation. The motor is capable of rotation at a constant speed in either direction. Shaft 44 is journaled in bearing 46 which is mounted in deck 12. Drive pulley 48 is secured to shaft 44 for rotation. The drive pulley has two grooved belt engaging surfaces 50 and 52. The effective diameter of these surfaces differs in an amount determined by the desired speed differential of pulleys 28 and 38. Continuous elastic belt 54 is engaged in tension on the belt engaging surfaces of the drive pulley and the driven pulleys. Thus, one portion of the belt is engaged in driving surface 52 and another portion of the belt is engaged in drive surface 50. The speed differential between pulleys 28 and 38 is determined by the diameter difference between belt engaging surfaces 50 and 52. Upon reversal of the direction of rotation of drive pulley 48, the speed differential between he driven pulleys is reversed but of the same absolute value because pulley 28 is the same diameter as pulley 38.

The operation of the embodiment illustrated in FIGURES 1 and 2 will now be described. Motor 42 drives shaft 44 in rotation at a constant velocity in one direction, for example, counterclockwise. Drive pulley 48 responds to this rotation. Driven pulleys 28 and 38 will rotate in a clockwise direction. Pulley 38 is driven by the portion of belt 54 which is engaged in belt engaging surface 50, while pulley 28 is driven by the portion of the belt which is engaged by belt engaging surface 52. Because of the diameter differential between the two belt engaging surfaces of drive pulley 48, driven pulley 38 will rotate at a slightly higher speed than pulley 28. Capstan 18 is then driven at a faster rate than capstan 16 and tape 40 will pass across head 14 in tension. When motor 42 drives shaft 44 in a clockwise direction the driven pulleys will rotate in a counterclockwise direction. Driven pulley 28 will rotate at a faster rate than pulley 38. This is because pulley 28 is being driven by the larger diameter belt engaging surface 50 of drive pulley 48. The absolute speed differential between pulleys 28 and 38, however, will always be the same because their belt engaging diameters are equal.

Figure 3:
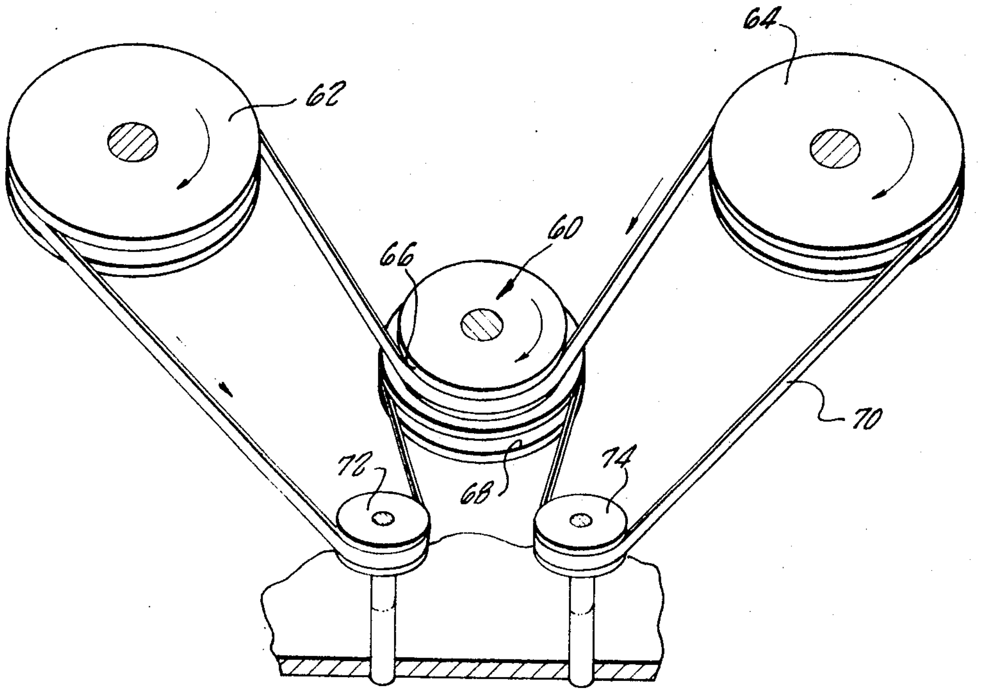
FIGURE 3 is a perspective depiction of an alternate embodiment of the invention.

FIGURE 3 depicts an alternate belt drive which employs idlers. This embodiment includes a drive pulley 60 and two equal diameter pulleys 62 and 64. Drive pulley 60 has two belt engaging surfaces of different diameters. Belt engaging surface 66 is slightly smaller in diameter than belt engaging surface 68. A continuous elastic belt 70 is engaged in tension on the belt engaging surfaces of the drive and driven pulleys. Canted idler 72 engages belt 70 in tension as does canted idler 74. These idlers are disposed to direct belt 70 for passage across the belt engaging surfaces substantially normal to the axis of rotation of the pulleys. Thus, idler 72 raises the elevation of the belt 70 as it passes between belt engaging surface 68 and pulley 62 an amount equal to the elevation difference between these two surfaces. In like manner, canted idler 74 raises the elevation of belt 70 between belt engaging surface 68 and pulley 64. The geometric disposition of the pulleys and the idlers produces a high-wrap angle across the belt engaging surfaces of the pulleys. Thus the canted idlers serve to eliminate belt slippage. When drive pulley 60 rotates clockwise, driven pulleys 62 and 64 will rotate in a counterclockwise direction. Driven pulley 64 will rotate at a slightly slower speed than pulley 62 because of the diameter differential between belt engaging surfaces 66 and 68 which is manifested because surface 68 drives pulley 62 and surface 66 drives pulley 64. When the direction of rotation is reversed, pulley 60 rotates in a counterclockwise direction resulting in the reversal of the speed differential between pulleys 62 and 64. Pulley 62 is then driven by belt engaging surface 66 and pulley 64 is driven by belt engaging surface 68. Because the diameters of pulleys 62 and 64 are equal the speed differential between the two will be constant for either direction of rotation.

Figure 4:
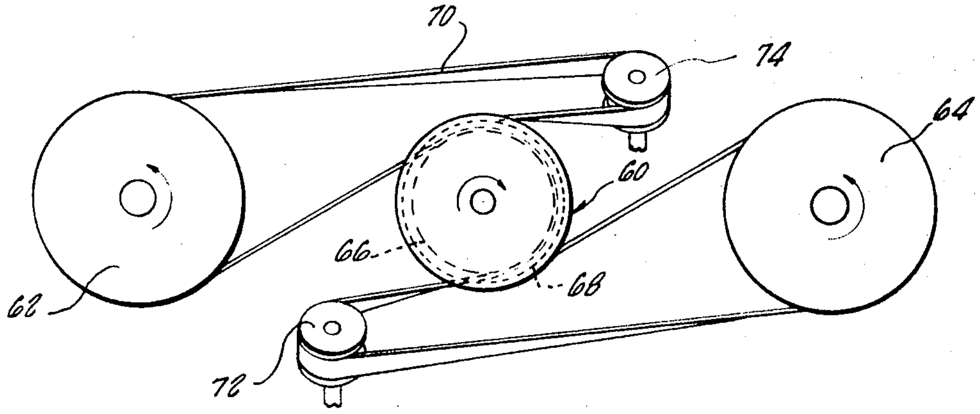
FIGURE 4 is a plan view of the embodiment shown in FIGURE 3 showing a modification.

FIGURE 4 is similar to FIGURE 3 but depicts a different geometric orientation for the drive pulley and driven pulleys. In this embodiment, elastic belt 70 drives pulley 62 from belt engaging surface 66 of pulley 60 when the latter is driven clockwise. Pulley 64 is driven by belt engaging surface 68 of pulley 60 and rotates at a slightly faster rate because the diameter of surface 68 exceeds the diameter of surface 66. Idler 74 engages belt 70 in tension to raise its elevation from pulley 62 to belt engaging surface 68. Idler 72 lowers the elevation of the belt from pulley 64 to belt engaging surface 66 of drive pulley 60. Upon reversing the direction of rotation such that drive pulley 60 rotates counterclockwise, the driven pulleys will rotate clockwise. In this event, pulley 64 is driven by belt engaging surface 66 and pulley 62 by belt engaging surface 68. When drive pulley 60 is rotating counterclockwise, pulley 62 will rotate slightly faster than pulley 64.

The instant invention has been described with reference to certain preferred embodiments. The scope and spirit of the appended claims should not, however, be limited to the foregoing description.

What is claimed is:

1. A speed differential apparatus comprising:
a base;
a first driven pulley rotatably mounted on the base for rotation about its mounting point and having radially disposed belt-engaging surfaces;
a second driven pulley rotatably mounted on the base for rotation about its mounting point and also having a radially disposed belt-engaging surface;
a drive pulley rotatably mounted to the base having first and second radially disposed belt-engaging surfaces of different diameters coaxially joined together for driven rotation in the same direction about its mounting point, the diameter difference of the drive pulley belt-engaging surfaces being chosen to effect a desired rotational velocity differential between the two driven pulleys; and
a continuous elastic belt disposed in tension about a portion of the belt-engaging surfaces of the first and second driven pulleys and the first and second belt-engaging surfaces of the drive pulley such that the rotational velocity differential between the two driven pulleys is reversed upon reversing the direction of rotation of the drive pulley.

2. The apparatus claimed in claim 1 including means for rotating the drive pulley at a consant speed in either direction.

3. The apparatus claimed in claim 2 wherein the elastic belt is disposed about the belt engaging surfaces of the driven pulleys and the drive pulley such that the driven pulleys rotate in the same direction.

4. The apparatus claimed in claim 3 wherein the belt engaging surfaces of the driven pulleys and the drive pulley are grooved to retain the elastic belt thereon.

5. The apparatus claimed in claim 2 including at least two canted tensioning idlers, each idler having a belt engaging surface engaging the elastic belt in tension, the idlers being mounted to the base such that the elastic belt passes in contact with the belt engaging surfaces of each of the pulleys at least substantially perpendicular to the pulley's rotational axis.

6. In a tape recorder having two capstans for engaging and driving magnetic tape across a magnetic head, an improved capstan drive comprising:
(a) a first driven pulley coupled to one of the capstans to drive such capstan in rotation, the first driven pulley having a radially disposed belt engaging surface;
(b) a second driven pulley coupled to the other of the capstans to drive such capstan in rotation, the second driven pulley having a radially disposed belt engaging surface of the same diameter as the belt engaging surface of the first driven pulley;
(c) a drive pulley having first and second radially disposed belt engaging surfaces of different diameters, the diameter difference being chosen to effect a desired rotational velocity differential between the two driven pulleys;
(d) means for rotating the drive pulley at a constant speed in either direction; and
(e) a continuous elastic belt disposed in tension about a portion of the belt engaging surfaces of the first and second driven pulleys and the first and second belt engaging surfaces of the drive pulley such that the driven pulleys rotate in the same direction and the rotational velocity differential between the two driven pulleys is reversed upon reversing the direction of rotation of the drive pulley.

7. The improvement claimed in claim 6 including at least two canted tensioning idlers, each idler having a belt engaging surface engaging the elastic belt in tension, the idlers being disposed such that the elastic belt passes in contact with the belt engaging surfaces of each of the pulleys at least substantially perpendicular to the pulley's rotational axis.

References Cited

UNITED STATES PATENTS 2,559,299 7/1951 Helling ---------- 74—217
3,257,515 6/1966 Nakamatsu -------- 226—49 X
3,330,493 7/1967 Seeley et al. ------ 352—124 X

FOREIGN PATENTS 727,125 9/1953 Great Britain.
1,838 1/1894 Great Britain.

ALLEN N. KNOWLES, *Primary Examiner.*

U.S. Cl. X.R.

226—108, 188, 195